United States Patent
Ek et al.

(10) Patent No.: US 6,667,781 B2
(45) Date of Patent: Dec. 23, 2003

(54) ELECTRONIC DEVICE

(75) Inventors: Martin Ek, Dalby (SE); Göran Schack, Yngsjö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 224 days.

(21) Appl. No.: 09/977,196

(22) Filed: Oct. 16, 2001

(65) Prior Publication Data

US 2002/0063815 A1 May 30, 2002

Related U.S. Application Data

(60) Provisional application No. 60/241,849, filed on Oct. 20, 2000.

(30) Foreign Application Priority Data

Oct. 17, 2000 (EP) .............................................. 00610108

(51) Int. Cl.[7] .................................................. G02F 1/335
(52) U.S. Cl. ............................. 349/63; 349/61; 349/110
(58) Field of Search .............................. 349/63, 110, 65, 349/62, 61, 111; 362/31

(56) References Cited

U.S. PATENT DOCUMENTS

| 5,581,380 A | | 12/1996 | Bergman |
|---|---|---|---|
| 5,708,487 A | | 1/1998 | Bergman |
| 6,128,054 A | * | 10/2000 | Schwarzenberger .......... 349/73 |
| 6,380,993 B2 | * | 4/2002 | Maeda ........................ 349/63 |
| 6,494,585 B1 | * | 12/2002 | Wada .......................... 362/26 |

FOREIGN PATENT DOCUMENTS

| EP | 0878720 A1 | 11/1999 |
|---|---|---|
| GB | 2336933 A | 11/1999 |

\* cited by examiner

*Primary Examiner*—Carl Whitehead, Jr.
*Assistant Examiner*—Thanhha Pham
(74) *Attorney, Agent, or Firm*—Burns, Doane, Swecker & Mathis L.L.P.

(57) ABSTRACT

An electronic device provided with a front lit LCD (13) having a theoretical viewing area (TVA). The electronic device comprises a transparent front light guiding plate (14) extending between the LCD (13) and a front (11) of said electronic device and the front (11) has an opening (12) through which the LCD (13) can be viewed through the transparent front light guiding plate (14). A masking (20) is provided between the LCD (13) and the front light guiding plate (14), said masking (20) having an opening (21) that substantially corresponds to the theoretical viewing area (TVA) of the LCD (13), and extending outwards from said opening (21). The opening (12) in the front (11) of the electronic device is larger than the opening (21) in the masking (20).

6 Claims, 1 Drawing Sheet

ELECTRONIC DEVICE

This application claims the benefit of Provisional Application No. 60/241,849, filed Oct. 20, 2000.

TECHNICAL FIELD

The invention relates to an electronic device provided with a front lit LCD having a theoretical viewing area, said electronic device comprising a transparent front light guiding plate extending between the LCD and a front of said electronic device, said front having an opening through which the LCD can be viewed through the transparent front light guiding plate.

RELATED PRIOR ART

An electronic device of this kind is known from GB-A-2 336 933 that shows the structure of a front lighting means for a liquid crystal display (LCD) for use in an electronic device. The electronic device comprises an upper casing provided with a front opening through which an LCD can be seen. A light guide member is positioned between the front opening and the LCD, said light guide member consisting of a transparent plate made of e.g. acrylic resin. A light source is provided near the edge of the light guide member and reflectors lead the light emitted from the light source to the edge of the light guide member.

The front opening of the casing of the electronic device is smaller than the light guide member and the LCD, i.e. its edges extend above the edges of the light guide member and the LCD. A theoretical viewing area of the LCD is defined as the area that is visible when looking at the LCD in a perpendicular direction. This means that the edges of the front opening of the casing define the size of the viewing area. However, since the front opening is positioned a distance, e.g. 1–2 mm, above the LCD having the light guide member therebetween and since the LCD in many cases will be viewed from an inclined angle, the actual viewing area will be smaller than the theoretical viewing area. This is due to the edges of the front opening of the casing that will hide a part of the theoretical viewing area when the LCD is viewed from an inclined angle. Furthermore, the edges of the opening of the casing may also cause a light source, e.g. the sun, to cast a shadow over a part of the theoretical viewing area, thereby reducing the actual viewing area even further.

OBJECT OF THE INVENTION

It is an object of the invention to provide an electronic device as mentioned in the opening paragraph in which the areas of the LCD that are hidden or shaded when seen under normal viewing angles as described above are reduced. This object should be achieved without enlarging the LCD which would increase the manufacturing costs, and furthermore a larger LCD would undesirably take up more space in the electronic device. The object should also be achieved without decreasing the active area of the LCD since this would influence the amount and/or quality of information shown by the LCD.

SUMMARY OF THE INVENTION

The object of the invention is achieved by providing a masking between the LCD and the front light guiding plate, said masking having an opening that substantially corresponds to the theoretical viewing area of the LCD, and extending outwards from said opening, and by providing that the opening in the front of the electronic device is larger than the opening in said masking.

By retracting the edges of the opening of the front in relation to the theoretical viewing area which is now defined by the edges of the masking immediately above the LCD, the actual viewing area substantially corresponds to the theoretical viewing area at least as long as the LCD is looked upon under normal viewing angles in which the edges of the opening of the front are not caused to be flush with the edges of the masking and therefore do not hide the edges of the masking. Furthermore, a light source, e.g. the sun, will only cast a shadow over the theoretical viewing area if the light falls on the LCD at a very acute angle.

In a first embodiment of the invention, the masking is printed on the front light guiding plate. Thereby no further structural parts are needed other than those included in the prior art devices. The printing can of course be made in any desired shape and colour.

In a second embodiment of the invention, the masking is made of a foil material positioned between the LCD and the front light guiding plate. In this embodiment one more structural part is included than those included in the prior art devices. An advantage is, however, that the masking may be changed by exchanging the foil only and, furthermore, the foil material can be used for providing the necessary gap between the LCD and the front light guiding plate.

Preferably all edges of the opening in the front are positioned above areas covered by the masking between the LCD and the front light guiding plate. This means that all edges of the front are retracted in relation to the edges of the masking, thereby minimizing the occurrences of hidden or shaded areas at any edges of the LCD.

The electronic device is preferably a mobile radio station, such as a mobile telephone.

It shall be emphasised that the term "comprise/comprising" when used in this specification is taken to specify the presence of stated features, integers, steps or components but does not preclude the presence or addition of one or more other features, integers, steps components or groups thereof.

DESCRIPTION OF THE DRAWINGS

The invention will be described in detail in the following with reference to the drawings in which.

DETAILED DESCRIPTION OF AN EMBODIMENT OF THE INVENTION

Figure 1:
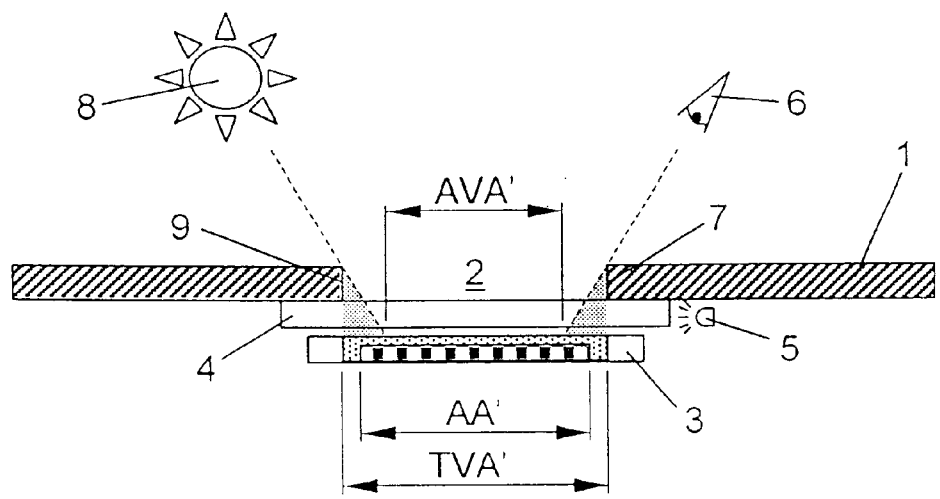
FIG. 1 shows a portion of an electronic device provided with a front lit LCD according to the prior art.

FIG. 1 shows a portion of an electronic device provided with an LCD according to the prior art. The electronic device comprises a front 1 having an opening 2 through which an LCD 3 can be seen. A transparent front light guiding plate 4 is positioned between the front 1 and the LCD 3, and a light source 5 is arranged at one edge of the front light guiding plate 4.

The LCD 3 has a theoretical viewing area TVA' corresponding to the area that can be seen through the opening 2 in the front 1 when viewed in a direction that is perpendicular to the front 1. In the theoretical viewing area TVA' the appearance of the LCD 3 fulfils high cosmetic requirements since this area is the area that the user can see. The areas outside the theoretical viewing area TVA' can normally not be seen by the user.

The LCD 3 also has an active area AA' that is the area in which pixels can be activated/deactivated, i.e. the area showing the desired information. The active area AA' is generally smaller than the theoretical viewing area TVA' as shown in FIG. 1.

When the LCD 3 is viewed from an inclined angle as indicated by the eye 6, the edge 7 of the opening 2 in the front 1 hides a part of the theoretical viewing area TVA' as well as a part of the active area AA' as indicated by the shaded triangle. Likewise, when a light source, e.g. the sun 8 as indicated, is present, the edge 9 of the opening 2 in the front 1 casts a shadow over a part of the theoretical viewing area TVA' as well as over a part of the active area AA' as indicated by another shaded triangle. If there are any activated pixels in the shaded area they will be hard to see.

Therefore, in this electronic device according to the prior art the actual viewing area AVA' is smaller than the theoretical viewing area TVA' and, under the angles shown, even smaller than the active area AA' whereby information will be hidden.

Figure 2:
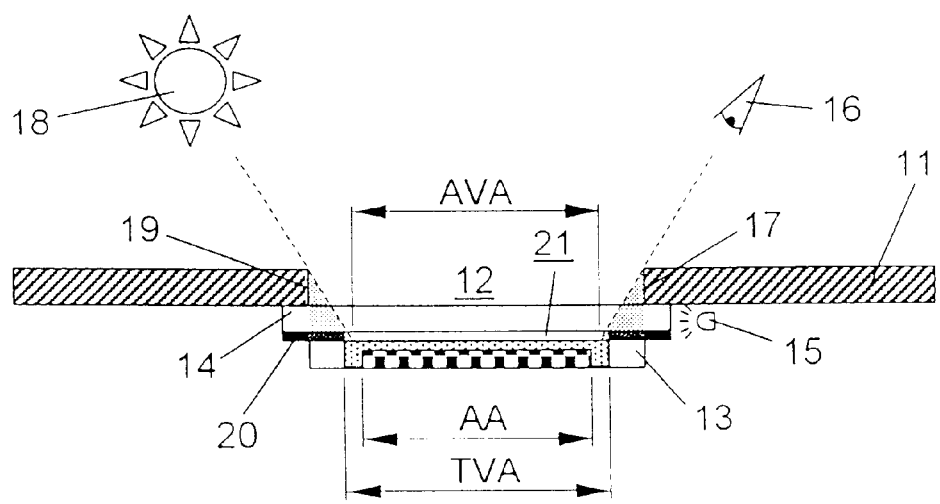
FIG. 2 shows a portion of an electronic device provided with a front lit LCD according to the invention.

FIG. 2 shows a portion of an electronic device provided with a front lit LCD according to the invention. Like the prior art electronic device described above, the electronic device according to the invention comprises a front 11 having an opening 12 through which an LCD 13 can be seen, a transparent front light guiding plate 14 positioned between the front 11 and the LCD 13 and a light source 15 arranged at one edge of the front light guiding plate 14.

The electronic device according to the invention further comprises a masking 20 positioned between the LCD 13 and the front light guiding plate 14. The masking 20 has an opening 21 through which the LCD 13 may be seen. The edges 17 and 19 of the opening 12 in the front 11 are retracted compared to edges 7 and 9 of the electronic device shown in FIG. 1, thereby making the opening 12 in the front 11 of the electronic device according to the invention larger than the opening 2 in the front 1 of the electronic device according to the prior art.

The theoretical viewing area TVA of the LCD 13 shown in FIG. 2 corresponds in size to the theoretical viewing area TVA' of the LCD 3 shown in FIG. 1. However, the theoretical viewing area TVA in the electronic device according to the invention is defined by the opening 21 in the masking 20 and corresponds to the area that can be seen through the opening 21 in the masking 20 when viewed in a direction that is perpendicular to the front 1. In the theoretical viewing area TVA, the appearance of the LCD 13 fulfils high cosmetic requirements since this area is the area that the user can see. The areas outside the theoretical viewing area TVA can normally not be seen by the user.

Like the prior art electronic device shown in FIG. 1, the LCD 13 also has an active area AA that is the area in which pixels can be activated/deactivated, i.e. the area showing the desired information. In this case too, the active area AA is smaller than the theoretical viewing area TVA.

When the LCD 13 is viewed from an inclined angle as indicated by the eye 16, the retracted edge 17 of the opening 12 in the front 11 does not hide a part of the active area AA as is the case in the prior art electronic device shown in FIG. 1. A very small part of the theoretical viewing area TVA may be hidden either by the edge 17 of the opening 12 in the front 11 or by the edge of the masking 20 which will inevitably be of some thickness even though it may be small. Likewise, when a light source, e.g. the sun 18 as indicated, is present, the edge 19 of the opening 12 in the front 11 does not cast a shadow over a part of the active area AA even though a very thin shadow may be cast over a part of the theoretical viewing area TVA due to the edge 19 or the masking 20.

Therefore, in most circumstances when the LCD is viewed from an inclined angle the actual viewing area AVA will be only slightly smaller than the theoretical viewing area TVA and no part of the active area AA will be hidden.

The masking 20 may be provided as a printed layer on the rear side of the front light guiding plate 14 or on the front side of the LCD 13. If this technique is applied the components in the display structure of an electronic device according to the invention correspond to the same components in the prior art display structures, except that a printing is applied to either the front light guiding plate 14 or the LCD 13.

The masking 20 may also be provided as a thin sheet of e.g. a plastics foil material positioned between the front light guiding plate 14 and the LCD 13. This solution requires a new component—the thin sheet—which, however, can be used for providing the necessary gap between the LCD 13 and the front light guiding plate 14.

A front glass will often be provided in the opening 12 of the front 11 in order to obtain a smooth surface of the front 11 of the electronic device. The front glass can be made in one piece with the front itself, i.e. the whole front is made of a transparent material having a printing in the non-transparent areas.

Other modifications can be made to the electronic device without departing from the general concept of the invention.

What is claimed is:

1. An electronic device provided with a front lit LCD having a theoretical viewing area (TVA), said electronic device comprising a transparent front light guiding plate extending between the LCD and a front of said electronic device, said front having an opening through which the LCD can be viewed through the transparent front light guiding plate, wherein a masking is provided between the LCD and the front light guiding plate, said masking having an opening that substantially corresponds to the theoretical viewing area of the LCD, said masking extending outwards from said opening in the masking, and wherein the opening in the front of the electronic device is larger than the opening in said masking.

2. An electronic device according to claim 1, wherein the masking is printed on the front light guiding plate.

3. An electronic device according to claim 1, wherein the masking is made of a foil material positioned between the LCD and the front light guiding plate.

4. An electronic device according to claim 1, wherein all edges of the opening in the front are positioned above areas covered by the masking between the LCD and the front light guiding plate.

5. An electronic device according to claim 1, wherein the electronic device is a mobile radio station.

6. An electronic device according to claim 5, wherein the mobile radio station is a mobile telephone.

* * * * *